ARRANGEMENT FOR CODE SIGNALLING IN AUTOMATIC TELEPHONE EXCHANGES

Filed April 1, 1963

3,260,801

ARRANGEMENT FOR CODE SIGNALLING IN AUTOMATIC TELEPHONE EXCHANGES

Manfred Buchmayer and Bernhard K. V. Lillsunde, Hagersten, Sweden, assignors to Telefonaktiebolaget L M Ericsson, Stockholm, Sweden, a corporation of Sweden Filed Apr. 1, 1963, Ser. No. 269,422
Claims priority, application Sweden Apr. 17, 1962, 4,240/62
8 Claims. (Cl. 179—84)

Figures 1, 2:
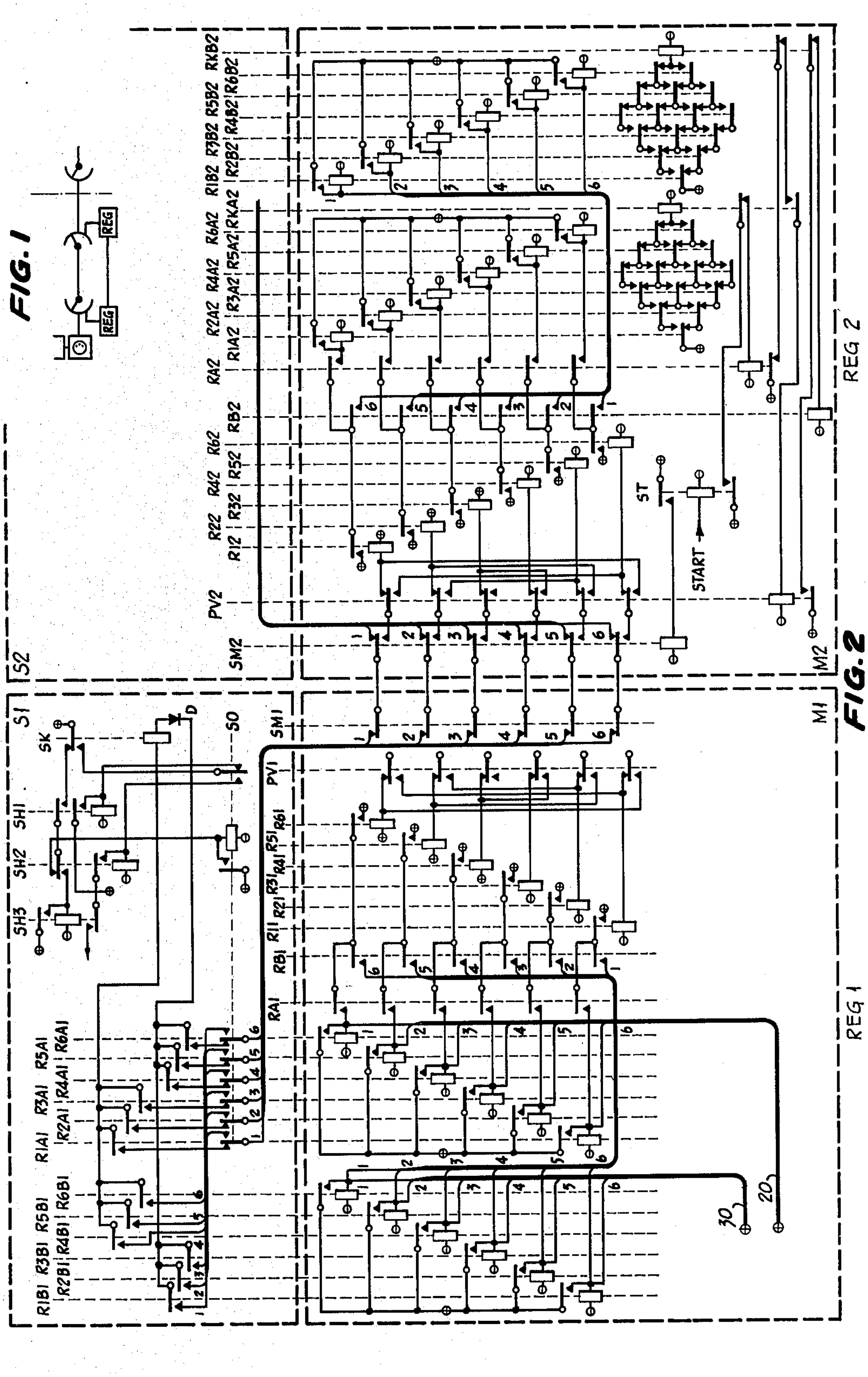

The present invention relates to an arrangement for code signalling between a sending and a receiving means in automatic telephone exchanges, for example between two registers, by means of a code signal which has a predetermined number of signal positions each containing a signal component with two possible values.

In order to have a reliable code signalling in automatic telephone exchanges, the condition must be fulfilled that the signalling should be controlled in such manner that the signals are sent out until acknowledgement of receipt in some form has been obtained from the receiving side, furthermore that the signalling should be controlled in such manner that a predetermined and always equally large number of signal components form the complete code signal, the receiving means carrying out a check that the number of signal components is correct.

A large number of different solutions for code signalling in telephone exchanges are known which however do not fulfil both said requirements. One of the most common solutions is direct current signalling through two wires with pole change when a polarized relay is operated on the receiving side. A disadvantage in said system is that the signalling can only be carried out with a limited velocity, furthermore the system is not controlled in such manner that it can be checked whether the signal has been perceived in the receiving exchange. In another known system three wires are arranged between the sending and the receiving means of which three wires each can obtain positive potential, negative potential or 0-potential respectively and a suitable combination of said potentials defines the respective signals. The disadvantage of this system is that it does not either allow controlling of the signalling in such manner that the signals are sent out until acknowledgement of receipt has been obtained, furthermore there is no control whether a 0-potential on one of the conductors defines a signal or if it depends on an interruption of the wire. The object of the present invention is to eliminate said inconveniences and to provide a signalling system that fulfils both conditions mentioned hereabove.

The arrangement according to the invention is substantially characterized by the fact that it comprises in the receiving means signal position means, the number of which corresponds to the number of signal positions in the signal and which form two different groups connected to different polarity and are operated depending on a signal component belonging to the respective signal position, signal channels which are connected each to its signal position means and lead to the sender, and in the sending means circuits for connecting with each other the signal channels, the signal position means of which are to be operated, so that current loops are obtained from said signal position means in one of said groups, through the sender and to the signal position means in the other group.

The invention will be further described here below by means of an embodiment with reference to the enclosed drawing. FIG. 1 shows a block diagram for a telephone exchange, in which signalling is carried out between a sending and a receiving register, and FIG. 2 is a circuit diagram of a sending and a receiving means for sending and receiving code signals which have six signal positions.

According to the embodiment signalling is carried out between two registers belonging to the same exchange through six wires. It is evident that signalling can be carried out also between a sending and a receiving means located in two different exchanges. In both means, between which signalling has to be carried out, according to the embodiment the registers REG1 and REG2, there are provided a sending and a receiving part S1, M1 respectively S2, M2. Signalling from S1 to M2 is explained as an example and for this reason S2 which is identical with S1, is not shown in the drawing. M1 is shown in the drawing as it takes part in the sending as well as in the receiving. Only those parts are shown which are of importance for explaining the principle of the invention. Between REG1 and REG2 six conductors are provided which by the aid of relays SM1 and SM2 respectively can be switched in such a way that signalling is carried out from REG1 to REG2 or oppositely, i.e. from S1 to M2 respectively from S2 to M1. The receivers M1 and M2 contain according to the embodiment two groups of registering relays R1A1–R6A1 and R1B1–R6B1 respectively R1A2–R6A2 and R1B2–R6B2 for registration of two-digit code signals and they are used for sending as well as for receiving, and signal position relays R11–R61 and R12–R62 respectively, used only on the receiving side.

Before the sending is started, the code signal to be sent is registered in the registering relays R1A1–R6A1 and R1B1–R6B1 respectively in the sending means. In each group of six relays, each relay corresponds to a signal position or code bit in the code signal. Each code signal is formed in such a way that it contains two groups of signal positions or bits each consisting of three signal positions or bits. Consequently the signal can have one operated position or "1" bit in one group and two operated positions or two "1" bits in the other group. In each group of the illustrated register relays R1A1–R6A1 and R1B1–R6B1, a code signal having a combination of three "1" bits and three "0" bits can be provided, and since each code combination requires two "1" bits in one group of three bits and one "1" bit in the other group of three bits, each code signal provides nine different code combinations or permutations. By providing the two separate groups of six register relays each, two code signals or words, each having nine possible combinations, are provided for a total of eighteen possible different code combinations or permutations. These code signals or combinations can be used to provide, for instance, the nine decimal digits, zero, and eight additional control or supervisory functions. Before the sending begins, three of the registering relays R1A1–R6A1 are operated to store a first code combination and three of the relays R1B1–R6B1 are operated to store a second code combination. These relays are operated by operating signals applied to the windings thereof over individual conductors in two cables 20 and 30. These operating signals can be supplied from any suitable means of well known construction, such as manual keys or a translator. Of the six lines which connect the sender with the receiver, three belonging to the operated registering relays R1A1–R6A1 will be connected to a current loop in such a way that two of the conductors in one group are connected in series with the third conductor belonging to the second group.

The sending is started in such manner that positive polarity is connected to the relay ST in the receiving means and the relay SM2 operates secondarily in the receiver. It is assumed for example that in the sender the registering relays R1A1, R5A1 and R6A1 have been operated which implies that the conductors 5 and 6 are connected in parallel to the current loop in the sender and are connected in series with the conductor 1. In consequence of this a current path is obtained through the winding of the signal position relay R12, conductor 1, cut-off contact of relay SO in the sender, make contact of relay R1A1, the current loop through a winding belonging to relay SK, a diode D, through make contacts of relays R5A1, R6A1, cut-off contacts of relay SO, and conductors 5, 6 to minus polarity through the windings of relays R52–R62. Thus the signal position relays R12, R52 and R62 in the receiver operate as a sign that the code signal has been received. Through the make contacts of said three relays and make contacts of the relay RA2 which has operated secondarily to the operation of the relay ST, the three corresponding registering relays R1A2, R5A2 and R6A2 will operate. These last mentioned relays are provided with make contacts which are connected with each other in such a way that they close a circuit only if three of the relays have operated. If thus the number of the operated relays is not larger or smaller than three, this implies that the correct code signal has been received so that the circuit through the contacts of the relays is completed to a relay RKA2. This relay will operate and it will interrupt the circuit to the winding of the relay RA2, so that the relay releases, the positive polarity through the cut-off contact on RA2 being connected to a relay PV2 which owing to its operation changes the polarity through the lines 1–6. The current passing through the current loop in the sender is interrupted since the diode D does not allow passing of current in this direction. Before change of polarity has occurred, the current through the current loop in the sender has caused operation of the relay SK. In consequence of this plus polarity has been connected from the make contacts of relay SK through the cut-off contact of relay SO to the winding of the relay SH1 which has operated and is maintained operated through its make contact. When the relay SK releases, in consequence of the polarity change, plus polarity will be connected to the winding of the relay SO through the cut-off contact of relay SK and through the make contact of relay SH1 and cut-off contact of relay SH2, so that the relay SO operates and connects the conductors 1–6 to the loop through the rectifier through the make contacts of the relays R1B1–R6B1, three of which are operated in correspondence to the second digit of the signal, for example the relays R2B1, R3B1 and R4B1. The connections are selected in such manner that current can again pass through the rectifier in view of the fact that the direction of the current through the lines 1–3 and 4–6 respectively is opposite in relation to the preceding signal. Consequently the signal position relays R22, R32 and R42 operate when the lines 2, 3 and 4 are connected to the loop in the sender as a consequence of the operation of the relay SO. Now a current is passing from the windings of the relays R22 and R32, through the conductors 2 and 3, through the current loop, through the conductor 4, through the winding of relay R42 to minus polarity. The relays R12, R52 and R62 released previously when the current through the diode ceased, owing to the change of polarity. In consequence of the operation of the relay PV2, a current has been connected to the winding of the relay RB2, whereby the current paths from the make contacts of the relays R12–R62 are connected to the relays R1B2–R6B2 so that in consequence of the operation of the signal position relays the relays R2B2, R3B2, R4B2 will operate. Through the make contacts of these relays a circuit is closed to the relay RKB2 which operates and interrupts the current for holding the relay PV2, so that the latter releases and again causes polarity change through the conductors 1–6. The current is again blocked by the diode D and the signal position relays release. The same proceeding can continue until an arbitrary number of digit signals have been transmitted and received. Thus the third signal is sent with the same polarity as the first signal. When the current passes through the loop during the sending of the second signal, the relay SK has again been operated, whereby current has been connected to the relay SH2 through the switching contact of relay SO. The relay SH2 is maintained operated so that through its make contact a current path can be connected to a relay SH3 from the cut-off contact of the relay SK upon its next release.

Sending of code signals from S2 to M1 is carried out in the same manner with the difference that in the last mentioned case the relay SM1 is operated and the relay SM2 is released.

The invention is evidently not limited to the embodiment described and to the code signal shown but the code signal may have an arbitrary number of signal positions. It is only essential that the signal positions are divided into two groups and the signal position means are selected in such a way that a current path always arises from the signal position means in one group through the sender to the signal position means in the other group.

We claim:

1. An arrangement for transmitting code signals consisting of a number of signal elements representing 0 or 1 condition from a sending means to a receiving means in automatic telephone exchanges, comprising a number of voltage responsive means in the receiving means corresponding to the number of signal elements in the code signal and being divided into two groups, a voltage source in the receiving means, means connecting the voltage responsive means in one of said groups to one pole of a voltage source, means connecting the voltage responsive means in the other of said groups to the opposite pole of said voltage source, a conductor individually coupled to each voltage responsive means and extending from the receiving means to the sending means, a switching circuit in the sending means having contact means for coupling selected conductors in the two groups to each other, and selecting means in the sending means for operating the switching circuit to close selected ones of the contact means in accordance with the signal elements forming the code signal to be transmitted so that different combinations of the voltage responsive means are operated representing the transmitted code signal.

2. An arrangement according to claim 1 including polarity changing means in the receiving means for changing the polarity of the voltage applied to the conductors, and means controlled by the operation of said voltage responsive means upon the reception of a code signal for operating the polarity changing means to cause current flow in opposite directions through the conductors when the next code signal is sent.

3. An arrangement according to claim 2 including additional contact means in the switching means selectively operated by the selecting means in accordance with a second code signal to be transmitted, and means in the sending means responsive to the operation of the polarity changing means in the receiving means for rendering the additional contact means effective to control the operation of the voltage responsive means.

4. A telephone system for transmitting a combinational code of a given number of bit positions from a sending means to a receiving means comprising a plurality of signal responsive means in the receiving means equal in number to the given number, said signal responsive means being divided into first and second groups, a potential source in the receiving means applying oppositely poled potentials to the signal responsive means in the first and second groups, a plurality of signal transmitting means equal in number to the given number and extending between the sending means and the receiving means, each of the signal transmitting means being individually coupled to one of the signal responsive means in the receiving means, and contact means selectively operated in accordance with the code signal to be transmitted for connecting different combinations of the signal transmitting means to each other in the sending means to complete common operating circuits for a selected combination of the signal responsive means including at least one signal responsive means in each of the first and second groups.

5. A telephone system for transmitting a combinational code of a given number of bit positions from a sending means to a receiving means comprising a plurality of signal responsive means in the receiving means equal in number to the given number, said signal responsive means being divided into first and second groups, a potential source in the receiving means applying oppositely poled potentials to the signal responsive means in the first and second groups, a plurality of conductors equal in number to the given number and extending between the sending means and the receiving means, each of the conductors being individually connected to one of the signal responsive means in the receiving means, contact means selectively operated in accordance with the code signal to be transmitted for connecting different combinations of the conductors to each other in the sending means to complete common operating circuits for a selected combination of the signal responsive means including at least one signal responsive means in each of the first and second groups, undirectional conducting means in the sending means included in the common operating circuits, and control means in the receiving means responsive to the receipt of a correct code signal by the signal responsive means for reversing the polarity of the potentials applied to the unidirectional conducting means in the sending means to interrupt the common operating circuits.

6. A telephone system for transmitting a code signal from a sending means to a receiving means in which a correct code signal includes a number S from a possible total number N of bits comprising a number N of signal responsive means in the receiving means divided into first and second groups, a potential source in the receiving means applying oppositely poled potentials to the signal responsive means in the first and second groups, a number N of signal transmitting means extending between the sending means and the receiving means, each of the signal transmitting means being individually coupled to one of the signal responsive means in the receiving means, contact means selectively operated in accordance with the code signal to be transmitted for connecting a number S of the signal transmitting means to each other in the sending means to complete operating circuits for a number S of the signal responsive means including at least one signal responsive means in each of the first and second groups, checking means in the receiving means for determining whether the received code signal includes S bits, and means controlled by the checking means for reversing the polarity of the potential applied to at least one of the signal transmitting means when S bits are received.

7. A telephone system for transmitting a code signal having a given number of bit positions from a sending means to a receiving means comprising a plurality of relays in the receiving means equal in number to the given number and each having an operating winding, said relays being divided into first and second groups, a potential source, means connecting one terminal of the operating winding of each relay in the first group to one terminal of the potential source and connecting one terminal of each relay in the second group to the oppositely poled terminal of the potential source, a conductor for the other terminal of the winding of each of the relays in the first and second groups extending to the sending means, contact means in the sending means for selectively connecting different ones of the conductors together to provide common operating circuits for the relays, and selecting means for closing different combinations of the contact means to operate different combinations of the relays in accordance with the code signal to be transmitted.

8. A telephone system for transmitting a code signal having a given number of bit positions from a sending means to a receiving means comprising a plurality of relays in the receiving means equal in number to the given number and each having an operating winding, said relays being divided into first and second groups, a potential source in the receiving means, means connecting one terminal of the operating winding of each relay in the first group to one terminal of the potential source and connecting one terminal of each relay in the second group to the oppositely poled terminal of the potential source, a conductor for the other terminal of the winding of each of the relays in the first and second groups extending to the sending means, first and second sets of contact means in the sending means for selectively connecting different ones of the conductors together to provide common operating circuits for the relays, selecting means for closing different combinations of the first and second sets of contact means in accordance with the code signals to be transmitted, control means normally rendering the first set of contact means effective to operate a combination of the relays representing the first code signal to be transmitted, means in the receiving means responsive to the receipt of the first code signal for changing the polarities of the potentials applied to at least some of the conductors, and means in the sending means responsive to the change in the polarity for operating the control means to render the second set of contact means effective to operate a combination of relays representing the second code signal.

References Cited by the Examiner

UNITED STATES PATENTS

| | | | |
|---|---|---|---|
| 1,916,760 | 7/1933 | Henry | 340—147 |
| 2,352,742 | 7/1944 | Soffel | 340—147 |
| 2,807,796 | 9/1957 | Germanton | 179—18 |
| 3,024,315 | 3/1962 | Faulkner | 179—18 |

FOREIGN PATENTS

| | | |
|---|---|---|
| 728,268 | 4/1955 | Great Britain. |

ROBERT H. ROSE, *Primary Examiner.*

WALTER L. LYNDE, *Examiner.*

H. BOOHER, H. ZELLER, *Assistant Examiners.*